Nov. 17, 1931. F. T. POWERS 1,832,656
PHOTOGRAPHIC CAMERA
Original Filed July 27, 1922 8 Sheets-Sheet 2

Inventor
Frank T. Powers
By his Attorney
John D Morgan

Nov. 17, 1931.  F. T. POWERS  1,832,656

PHOTOGRAPHIC CAMERA

Original Filed July 27, 1922  8 Sheets-Sheet 5

Inventor
Frank T. Powers
By His Attorney
John D. Morgan

Nov. 17, 1931.  F. T. POWERS  1,832,656
PHOTOGRAPHIC CAMERA
Original Filed July 27, 1922   8 Sheets-Sheet 6

Patented Nov. 17, 1931

1,832,656

UNITED STATES PATENT OFFICE

FRANK T. POWERS, OF DOUGLASTON, LONG ISLAND, NEW YORK

PHOTOGRAPHIC CAMERA

Application filed July 27, 1922, Serial No. 578,022. Renewed July 9, 1930.

The invention relates to photographic cameras, and more particularly to mechanism for alternatively or selectively presenting light sensitive materials of different desired sizes for exposure within the camera, and to certain essential or desirable cooperating mechanisms.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Referring now to the embodiment of the invention, illustrated by way of example in the accompanying drawings, the invention is shown applied to a copying camera, operated in connection with a dark room, the back of the camera opening into and being accessible from the dark room. Certain parts of the camera and cooperating parts are shown more or less conventionally to completely indicate in a general way such an exemplary embodiment. It will be understood that the invention in many of its features may be employed with other kinds of cameras and in other relations.

Figure 1:
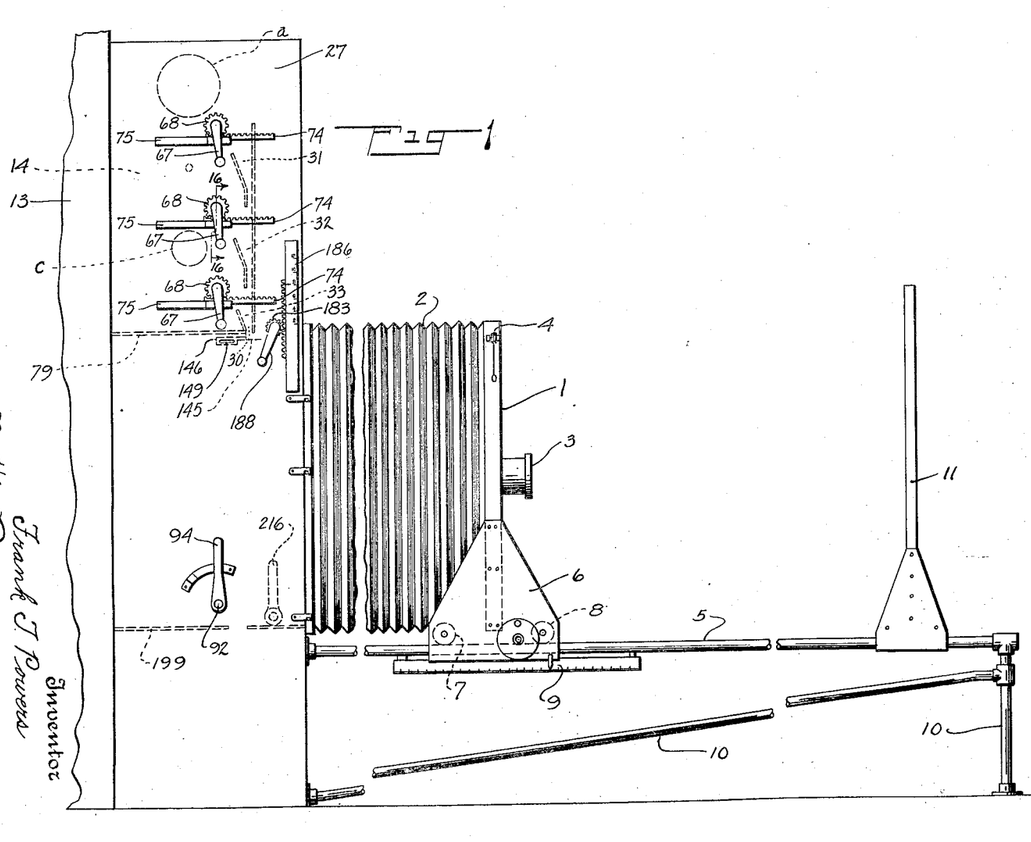
Fig. 1 is a fragmentary elevation of a camera embodying the invention.

In said illustrated exemplary embodiment, a camera 1 is shown having an extensible and contractible body 2, and a lens 3 with shutter operating mechanism 4. The lens board and forward end of the camera are mounted to slide to and fro upon rods 5, by suitable means, such as supports 6 carrying rollers 7 and 8 running upon the rods 5. A focusing scale 9 may be employed, and the rods 5 may be supported by a suitable structure 10. A copy board 11, of any suitable or convenient form may be employed.

The back end of the camera, in this exemplary embodiment, is shown attached to and opening into a dark room 13, and having a plurality of doors 12, and this arrangement will be found convenient and preferable in certain kinds of copying and process work.

Means are provided by the invention for presenting at the focal plane of the camera (the expression "focal plane" indicating herein the place of presentation of the light sensitive material to receive the light impression of the image from the lens) any one of a plurality of different sized carriers for a light sensitive material, alternatively and selectively at the will of the operator, to receive the exposure, whereby the quantity of light sensitive material used for the successive exposures is just of the size required and there is no wastage of the light sensitive material.

Also the alternative and selective presentation of the different sized materials is effected easily, rapidly and with precision. In the preferred embodiment of the invention, the different sized light sensitive materials are preferably in strip form, are fed from a roll, and are cut off to suit the size of the exposure without wastage. Other cooperating mechanisms, effecting the easy, rapid and precise handling of this preferred form of the sensitive material, are comprised by the invention and will be first described in connection with the later detailed description.

Figure 5:
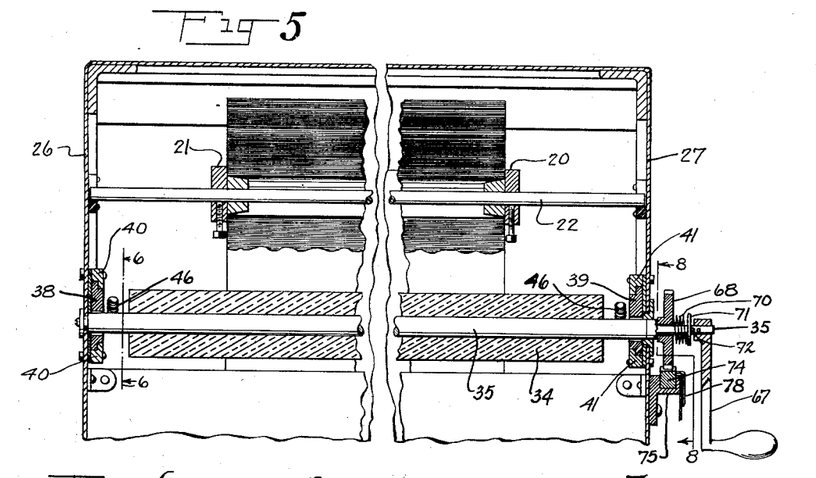
Fig. 5 is a fragmentary, transverse vertical section taken substantially on the line 5—5 of Fig. 2.

Referring now in detail to the present preferred embodiment of the means for supplying and presenting at the focal plane, alternatively and selectively any one of a plurality of different sized light sensitive strips or webs, a plurality of mechanisms are provided for supporting strips $a$ and $c$, the intervening strip and roll being omitted for the sake of showing certain parts of the mechanism. The mechanism for handling the light-sensitive material is contained in the chamber at the rear of the camera, which may be called, for convenience, the "dark chamber" 14. As embodied, each of these strips is mounted on rollers, or preferably screw-held end blocks 20 and 21 (as shown in Fig. 5) respectively, these rollers in turn being mounted on shafts or spindles 22 and 23, a like spindle 24 being shown for the intervening omitted roll. These spindles are removably mounted, at either end thereof, respectively, in U-shaped supports or bearings 25, carried on the side walls 26 and 27 of the "dark chamber" 14, constituting the rear end of the camera. This chamber opens into the dark room 13 as best appears from Fig. 2.

Means are provided for feeding the desired light sensitive material to the focal plane of the lens, and for positioning it properly there to receive the light impression or image. In the present preferred embodied form, this means is adapted to operate, at the selection or option of an operative, upon the strips $a$ or $c$, or on the intervening strip which has been omitted in Fig. 2. In connection therewith, means are provided for measuring the feed of the selected light sensitive material so as to effect the accurate positioning thereof as stated.

In the embodied form of such means, the various strips, in roll form are located above, and are directed by suitable mechanism into the top of a guideway, which directs the end of the strip into the focal plane of the camera, and this feed is controlled by measuring mechanisms, already referred to. As embodied, a guideway 30 is provided with a plurality of receiving chutes or openings 31, 32 and 33, arranged one above another in one side of the guideway, for the respective strips $a$, $c$, or other light sensitive media. Receiving the light sensitive material from the bottom of chute 30 after the exposure, are cooperating devices which will be later described.

Figure 6:
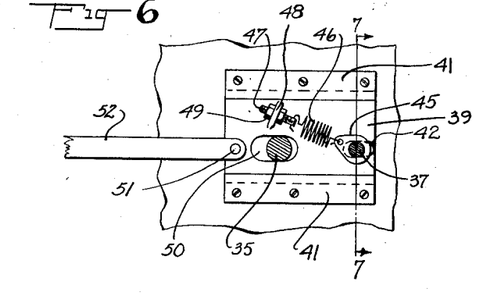
Fig. 6 is a fragmentary detail elevation of a part of the strip feeding mechanism shown in Figs. 2 and 5, taken on line 6—6 of Fig. 5.
Figure 7:
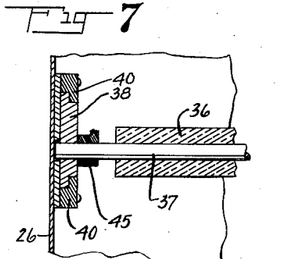
Fig. 7 is a fragmentary vertical section, taken on the line 7—7 of Fig. 6.
Figure 8:
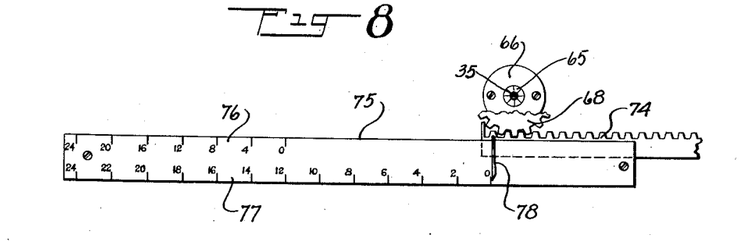
Fig. 8 is a greatly enlarged fragmentary detail in elevation of one of the strip feeding measuring devices shown in the upper part of Figs. 1 and 5, taken on line 8—8 of Fig. 5.
Figure 9:
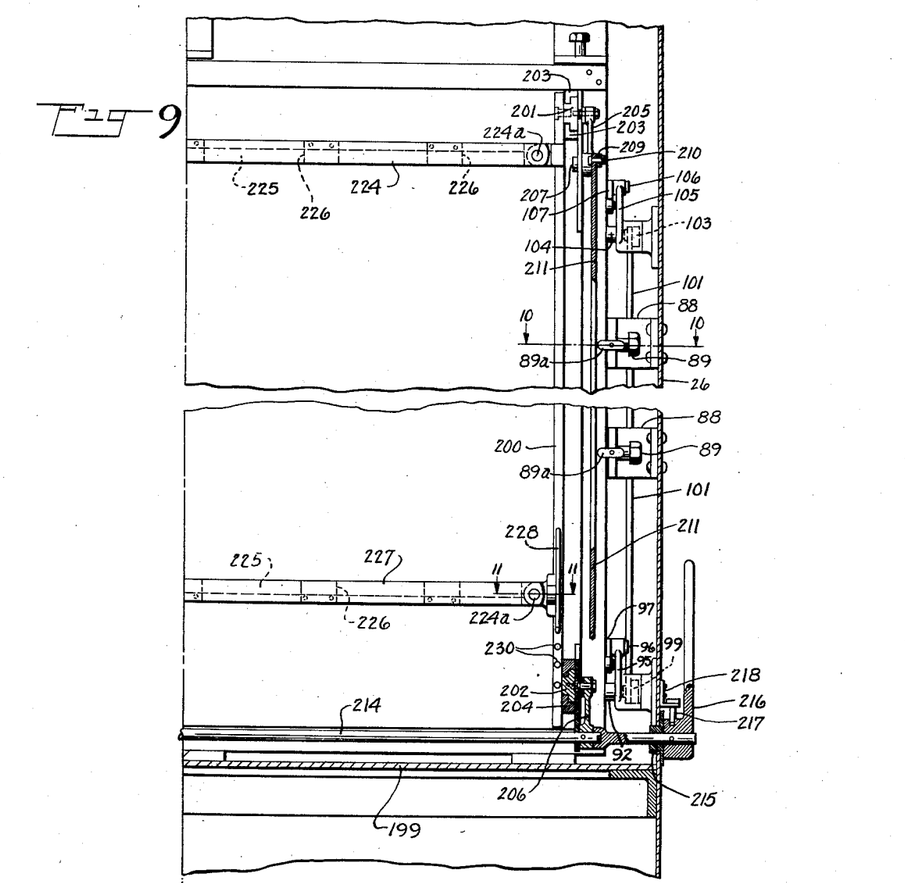
Fig. 9 is a fragmentary transverse vertical section, taken substantially on the line 9—9 of Fig. 3.
Figure 10:
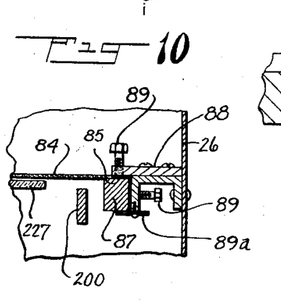
Fig. 10 is a fragmentary detail horizontal section, taken substantially on the line 10—10 of Fig. 9.
Figure 11:
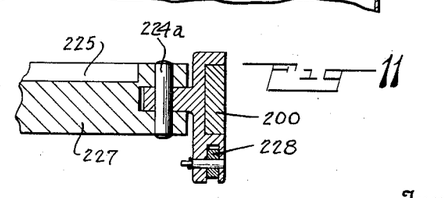
Fig. 11 is a like section taken on the line 11—11 of Fig. 9.
Figure 12:
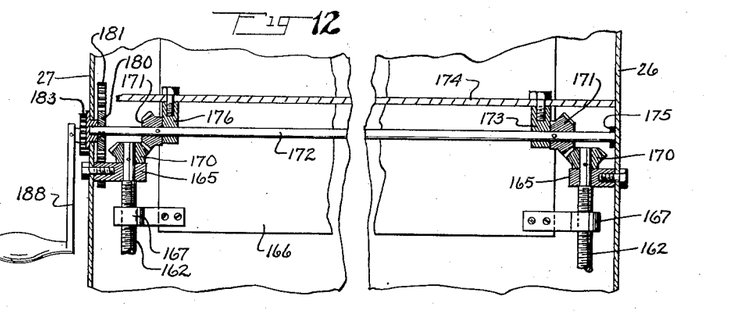
Fig. 12 is a fragmentary transverse vertical section, taken substantially on the line 12—12 of Fig. 2.

As embodied, there is a feeding and measuring mechanism for each roll, and each such mechanism comprises (Figs. 1, 2, 5, 6, 7 and 8) a roller 34 (see especially Figs. 2, 5 and 6) rotating in a fixed position, having a shaft 35 journaled in the side walls 26 and 27 of the dark chamber 14.

Cooperating with each roller 34 is a spring-pressed or otherwise yieldingly-acting roller 36 (see especially Figs. 2, 6 and 7), which is likewise preferably movable into and out of feeding relation with the roller 34. In the embodied form of such means, roller 36 is mounted on a shaft 37, which shaft is rotatively journaled in slots 42 in a pair of slides 38 and 39, which slides are reciprocable, respectively, in pairs of guideways 40 and 41, mounted upon the side walls 26 and 27 of the dark chamber 14.

To effect the yielding spring action, there are mounted on each end of the respective shafts 37, and fitting snugly thereabout, plates 45, to which plates, respectively, are attached tension springs 46. These springs at their other ends are connected to corresponding screw rods 47, passing through lugs 48, formed in the respective slides 38 and 39, and having suitable adjusting nuts 49.

The slides 38 and 39, respectively, have slots 50 encircling the shafts 35 of the various feeding rollers 34, so that the slides may move independently of the rollers 34. Pivotally connected at 51 to each of the slides 38 and 39 is a rod 52 (Figs. 2 and 6), having therein notches 53 and 54, which cooperate with pins 55 and 56 mounted in the side walls of the dark chamber 14. Rods 52 may also have handles 57. Thus any rod 52 may be moved to move the corresponding spring-pressed roller 36 into or out of feeding relation with respect to its cooperating roller 34.

Figure 2:
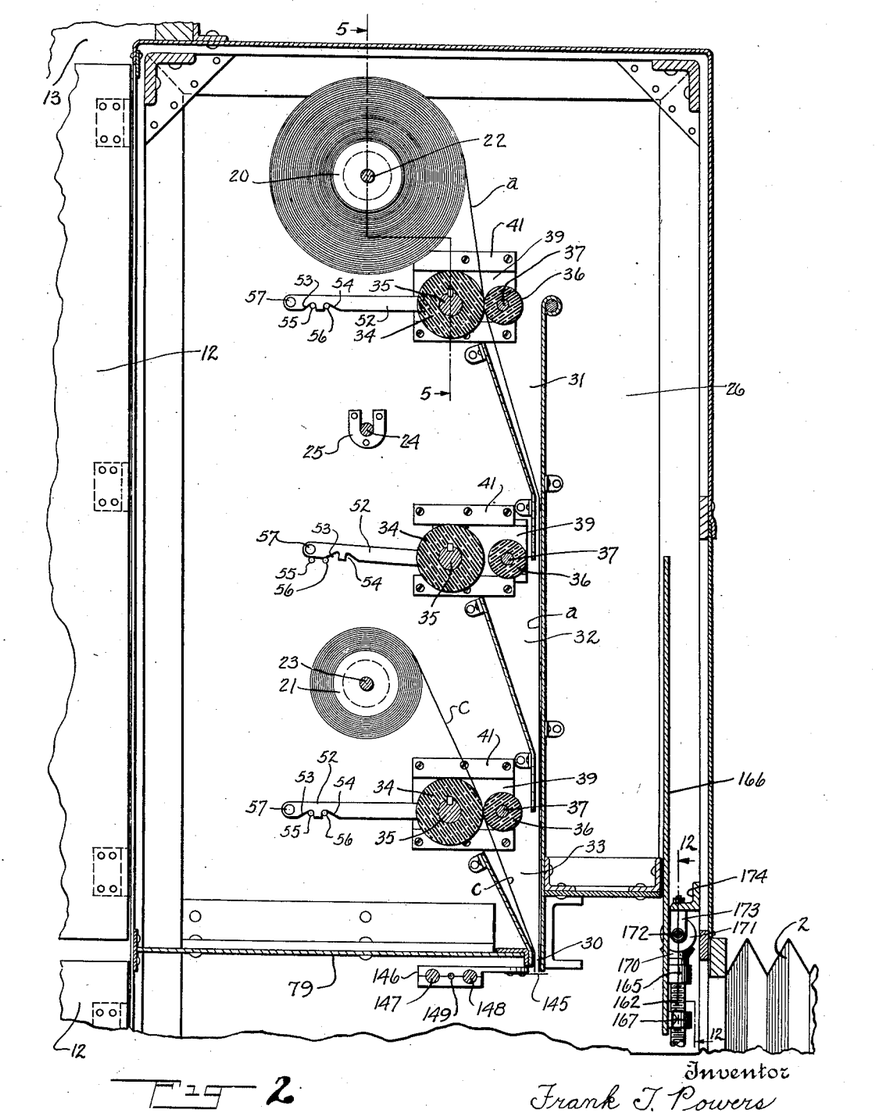
Fig. 2 is a vertical, substantially central section, on an enlarged scale, of the upper part of the mechanism shown in Fig. 1.

In Fig. 2 the upper and lower rollers 36 are shown in feeding relation on their strips while the intervening roller 36 is shown in the thrown-off position. In this position the strip from a newly inserted roll of sensitive material is readily threaded between the rollers, and then by drawing the rod 52 backwardly, the roller 36 is brought to position to feed the strip of light-sensitive material forward as desired and required until the strip is exhausted. The slotted mounting 42 for shaft 37 of the roller 36 permits the desired spring pressure from the springs 46 while permitting the positive throw-off for the roller as already described.

Means are provided by the invention for easily, readily, and accurately positioning the light-sensitive material in the focal plane of the camera and in proper position for the desired size of image, and in connection with the present illustrative embodiment this means is applied to the feed of the strips of light-sensitive material from the roll. As so embodied (Figs. 1, 5, 8 and 16), to one end of each shaft 35 is fixed one member 65 of a crown-tooth clutch, the shaft 35 at this end being journaled in a bushing 66 mounted in the side wall 27 of the dark chamber and at the other end in the wall 26.

Fixed also to the shaft 35 is a crank 67, by which the roller 34 may be rotated. Loose on shaft 35 is a pinion 68, having a crown-tooth clutch member 69, cooperating with the clutch member 65. A relatively light helical spring 70 is coiled about the shaft 35, in compression between the pinion 68 and a disc 71, which disc encircles shaft 35 and is held in place longitudinally thereof by a pin 72.

Figure 3:
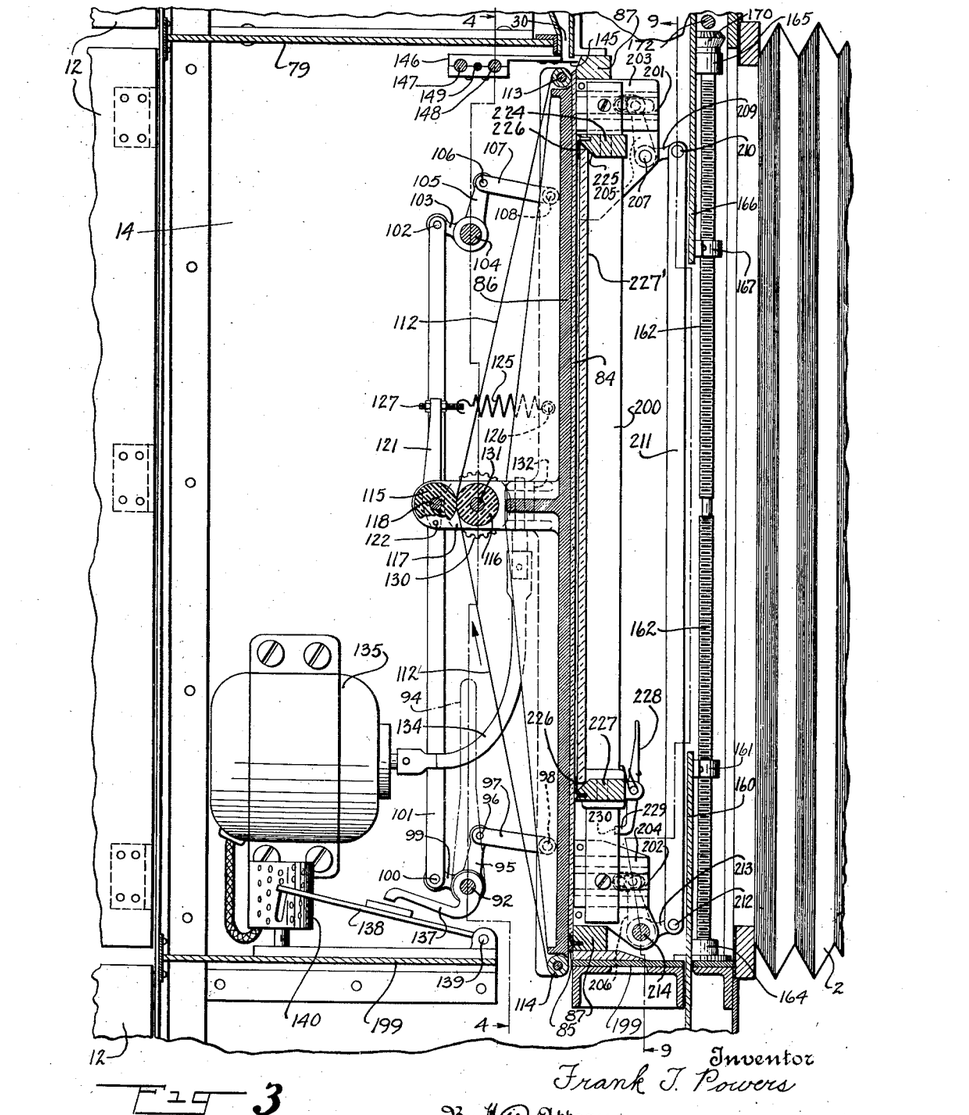
Fig. 3 is a like view of the mechanism in the lower left hand part of Fig. 1 (Figs. 2 and 3 constituting a complete vertical section, with Fig. 2 above and Fig. 3 directly therebeneath)
Figure 4:
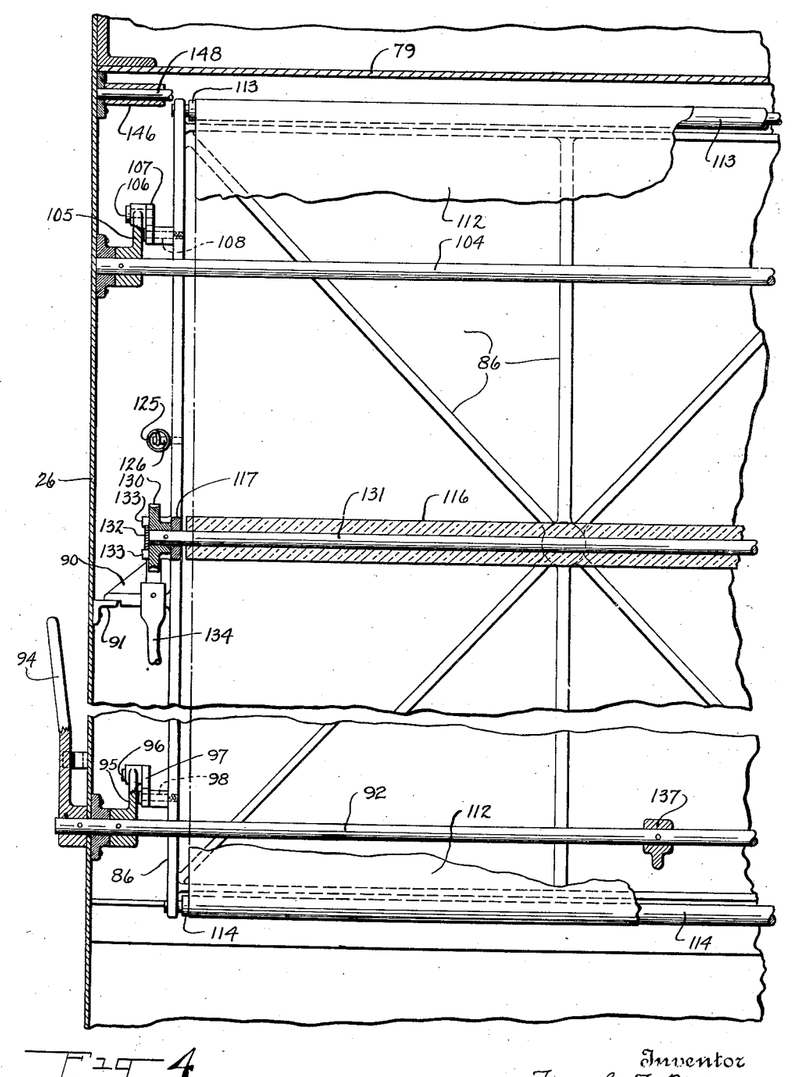
Fig. 4 is a fragmentary vertical section taken substantially on the line 4—4 of Fig. 3.

Meshing with pinion 68 is a straight geared rack 74, disposed horizontally, and sliding in a guideway 75, which guideway is fastened to the outer side wall of the dark chamber. On the outer wall of the guide 75 there are marked two scales 76 and 77 (uses of which will be later described), and a pointer 78 is fixed to the bar 74 and is in indicating relation with respect to both scales. A floor 79 in the dark chamber may be provided between the above-described mechanism and the lower part of the chamber, a plurality of corresponding doors 12 being provided therewith (as shown in Figs. 2 and 3).

Figure 18:
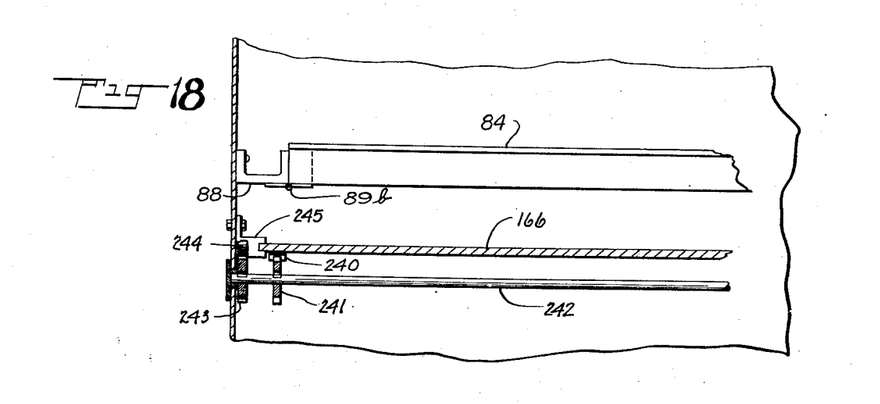
Fig. 18 is a fragmentary horizontal section, taken substantially on the line 18—18 of Fig. 17.

Means are provided by the invention, co-operating with the foregoing, and having especially in view operating upon flexible light-sensitive material, for holding the light-sensitive material firmly and smoothly in proper position to receive the image from the lens. As embodied, a plate of glass or other light-transmitting material 84 (Figs. 4, 9, 10 and 18) is mounted just back of the bellows or extension part of the camera and just in front of the light-sensitive material as it is fed down through the guideway 30. This glass plate is supported in any suitable manner, as by a frame 87 on the front, and clips or strips 85, in engagement with the edges and the back thereof. Frame 87 rests in a plurality of holding lugs 88 fixed to the camera structure, and having back and edge adjusting or positioning screws 89, and retaining clips 89$^a$. In Fig. 18 is shown a modified form wherein frame 84 is hinged, as at 89$^b$, to lugs 88 and swings out instead of being bodily displaceable.

Cooperating therewith and adapted to press the light-sensitive material thereagainst, is a plate 86, which is substantially of the full size of the opening at the rear of the camera, or slightly larger, and this plate has a to and fro sliding movement whereby it moves backwardly (to the left in Fig. 3) to permit the free downward feed of the strip of sensitive material, and then moves forwardly (to the right in Fig. 3) to press the sensitive strip against the plate 84.

For this purpose it is provided at either side with lugs 90, which seat respectively on horizontally-disposed guideways 91, supported upon the inner side of the walls of the dark chamber 14. For the purpose of moving the plate 86 to and fro, a shaft 92 is journaled (Figs. 1, 3, 4 and 9) in the walls of the dark chamber. Fast to the shaft outside the chamber is a lever arm 94, whereby the shaft may be rocked.

Within the dark chamber, at either side, there are fixed to the shaft 92 arms 95, to which there are pivoted at 96, links 97 which links are pivoted at their other ends 98 to the plate 86 near its bottom end. To effect parallel movement of the plate 86 there is also fixed to shaft 92 an arm 99, to which is pivoted at 100 a link 101. This link is pivoted at 102 to an arm 103, which arm is fixed on a shaft 104, journaled in the upper part of the lower dark chamber.

Fixed to shaft 104 at either side are arms 105, pivoted at 106 to links 107, which at their other ends 108 are pivoted to the plate 86. Thus by slightly rocking the arm 94 on the exterior of the camera there is imparted the requisite slight to and fro movement to the plate 86.

Figure 13:
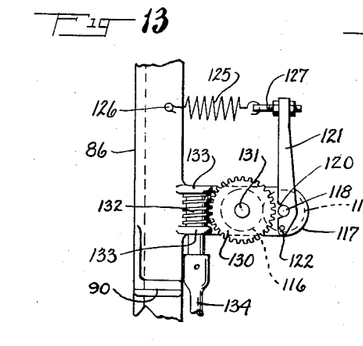
Fig. 13 is a detached fragmentary elevation of the drive for the rolls for the endless belt, shown also near the center of Fig. 2.
Figure 14:
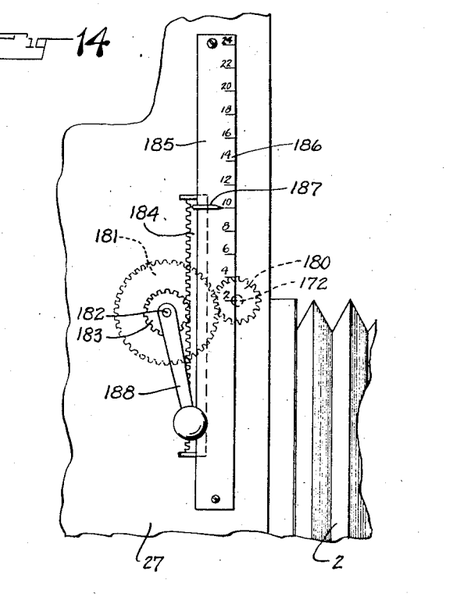
Fig. 14 is a fragmentary detail elevation, greatly enlarged, of the positioning mechanism for the masking slides, this mechanism being shown near the center of Fig. 1.
Figure 15:
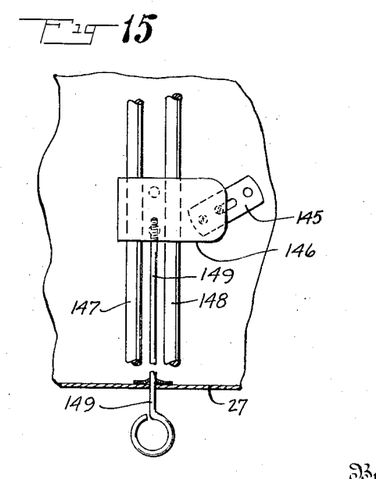
Fig. 15 is a fragmentary, detached detail of the strip cutting mechanism.
Figure 16:
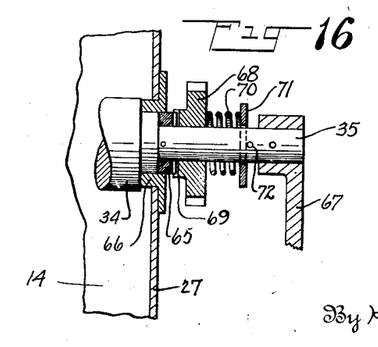
Fig. 16 is a fragmentary greatly enlarged vertical section, taken substantially on the line of 16—16 of Fig. 1.

Means are preferably provided by the invention for assisting in the feed of the free end of the strip of light-sensitive material preparatory to exposure, and also for the expulsion or feeding out of the cut-off exposed end of the strip preparatory to developement. In the embodied form of said means (Figs. 3, 4 and 13) an endless belt of material 112 runs over guide rollers 113 and 114 arranged, respectively, at the top and the bottom ends of the presser plate 86, the belt thus running downwardly over the inner surface of the plate as indicated by the arrow in Fig. 3.

In the embodied form of feeding means, the belt 112 runs also between spring-pressed rollers 115 and 116, journaled in a bracket 117 extending rearwardly from the presser plate 86. The belt is positively driven by these rollers to effect the functions already described. As embodied, roller 115 (Figs 3 and 13) is mounted for spring pressure, and its pintles 118 are engaged by recesses 120 in arms 121, which arms are provided at 122 upon the bracket 117. The outer end of arms 121 are acted upon resiliently by springs 125, in tension between a pin 126 on the frame and an adjusting screw 127, mounted in the end of the lever 121.

The roller 116 is positively driven, and for this purpose a worm wheel 130 is fixed to one end of the shaft 131 of roller 116. Meshing with the worm wheel is a worm 132, journaled in supports 133, the worm being driven by a flexible shaft 134, which is fast to and is rotated with the shaft of a motor 135, located preferably within the dark chamber 14.

Means are preferably provided for driving the endless belt 112 during the time when the presser plate 86 is out of pressing position. For this purpose, as embodied, automatically operating means are provided (Fig. 3), comprising a lever 137, fixed to shaft 92, and adapted to engage with a spring-pressed lever 138, pivoted at 139, and having its other end engaging with a starting resistance 140 for the motor 135, which resistance may be of any desired form and is conveniently shown of a standard type which is used with small motors. Thus when the shaft 92 is rocked to retract the presser plate 86, the current will be turned on by the action of the lever 138, and through rollers 115 and 116, endless belt 112 will be driven in the direction of the arrow of Fig. 3. When plate 86 is brought back to pressing position, lever 138 will be released and the motor will be stopped, and belt 112 will be at rest.

Means are provided for cutting off the exposed end of the light-sensitive strip and to do this in a manner to prevent wastage and so that a single cutting device will effect this for all the various sizes of sensitive strips and of exposures. As embodied, a knife 145 (Figs. 1, 2, 3, 4 and 15), is mounted on a carrier 146, which is mounted upon and slidable along a pair of guide rods 147 and 148, which are mounted in the walls of the dark chamber and extend along beside the path of the light-sensitive strips above the place of exposure. An actuating rod and handle 149 is fixed to the carrier 146 and extends to the outside of the camera.

Means are also provided by the invention for varying the area of light exposure at or just in front of the focal plane of the lens, to regulate the size of exposure desired, and these devices I style for convenience "masking slides". In the preferred embodiment thereof (Figs. 2, 3, 12 and 14) an upper and lower slide are arranged to approach or to recede from each other, to regulate the size of the exposure opening in front of the sensitive strips. The lower slide 160 extends across the camera near to and in front of the focal plane. At or near either side of its upper edge, this slide is provided with nuts 161, in threaded engagement with a corresponding right-hand and left-hand screw-rod 162, which is rotatably supported in a bottom bearing 164 and a top bearing 165.

The upper masking slide 166 has nuts 167 fixed thereto at or near either side of the bottom edge thereof, which nuts are screw-threaded on the opposite threads of the screw-rods from those of the bottom slide 160. Means for rotating the screw-rods 162 as embodied (Figs. 2, 3 and 12), comprise a pinion 170, fixed to the tops of the screw-rods, respectively, the pinions resting on the tops of the corresponding supports 165. Meshing, respectively, with the bevel pinions 170 are bevel pinions 171, fixed on a shaft 172, which shaft is journaled in supports 176 and 173, hung from the angle piece 174, fixed to the inner front wall of the dark chamber.

An additional support 175 is shown for one end of the shaft 172, and the driving mechanism therefor is located at the opposite end. Said driving means, as embodied, comprise a pinion 180, fixed on shaft 172, and meshing with this pinion is a gear wheel 181, fixed on a short shaft 182, to which is also fixed a pinion 183. Meshing with the pinion 183 is a straight gear bar 184, running in guides in a piece 185, which piece is provided with a scale 186, a pointer 187, fixed on the ratchet bar 184, cooperating with the scale.

The manner of operation of the mechanism just described is substantially as follows:

The rolls a, b (not shown) and c of film, coated paper or other light-sensitive material, are placed in their supporting bearings 25 and the ends of the strips threaded into the bite of the respective pair of feeding rolls 34 and 36. This is done in the present embodiment by the rolls of sensitive material being inserted into the dark chamber 14 of the camera through the door 12 which opens into the dark room. After being so threaded the film or other sensitive strip is run down into the guideway 30. Each strip of film is in such relation to the guideway that it may be fed into the exposure area of the focal plane by actuating the corresponding feed mechanism without disturbing the relation of the other strips to the guideway or to their feeding mechanism.

Preparatory to the exposure of the strip, the masking slides are properly positioned by turning the shaft 182 through the crank 188, the exact position of the slides being indicated on the exterior of the camera by the relation of the pointer 187 to the scale 186. Thus the light action on the film, considered longitudinally thereof, will be thereby limited to the size of the image, while the width of the film strip is relied on in the present embodiment to give the crosswise dimension.

The selected sensitive strip is fed downward by turning the corresponding crank 67, and by means of the travel of the pointer 78 along the scale 76, the positioning of the film strip or other light-sensitive material in the exposure area between the masking slides can be determined, so that the lower end of the strip will come just to, or just a very little beyond, the top edge of the lower masking slide 160.

During this feed of the sensitive strip the presser plate 86 is in the retracted position, and the endless belt 112 is running in the direction of the arrows, and will assist in feeding down the free end of the sensitive strip. When the pointer 78 has moved to the proper indication on the scale, lever 94 is rocked and the presser plate 86 presses the strip against the glass plate 84, and this motion of the lever 94 will stop the motor and therewith the feeding of the endless belt 112. After the exposure has been made, the lever 94 is rocked back to the left in Fig. 3, which moves the pressure plate 86 back to the free position, and again starts the motor and therewith the endless belt 112.

For the purpose of cutting off the film without waste, in the present embodiment there is a backward feed of the film to bring the proper point or line, that is, the top edge of the exposure into proper relation to the knife 145. For this purpose the light-sensitive strip feeding mechanism is operated in the opposite direction by the crank 67 until the pointer 78 is brought to the corresponding indication on scale 77 to that which was used on scale 76 for the downward feed to position the strip for the exposure. The rod 149 is then operated to slide the knife 145 across the film, which cuts off the strip at the upper edge of the exposed area. The cut off piece then drops downwardly within the presser plate 86 and the endless belt 112 ejects it positively from the bottom end of the plate, through a slot in a floor 199 into a suitable receptacle in the lower part of the dark chamber 14, whence it is removed into the dark room or elsewhere.

The next exposure may be made in the same manner either from the same light-sensitive strip or from one of the others, as desired, by the operator without any preparations other than actuating the corresponding feed mechanism substantially as already described.

Means are provided by the invention for maintaining a half-tone screen in a desired relation to the light-sensitive strip for process work, said means as embodied comprising devices for taking half-tone screens of different sizes and for regulably varying the distance of any half-tone screen from the light sensitive strip. As embodied, the holder for the half-tone screen comprises vertically-disposed members or bars 200, arranged at either side of the camera, just in front of the plate 84.

These bars are horizontally slidable or adjustable, longitudinally of the camera, and for this purpose they are mounted upon blocks 201 and 202, located at their top and bottom ends, respectively, and sliding in corresponding guideways 203 and 204, mounted upon the camera frame. For the purpose of imparting the desired slight slidable movement to the screen, the slides 201 and 202, respectively, have pivoted thereto arms 205 and 206. The respective arms 205 are pivotally mounted at 207, and integral therewith are arms 209. Arms 209 have their other ends pivoted, respectively, at 210 to vertically-disposed links 211 which are pivoted respectively at 212 to arms 213, fixed to a shaft 214 journaled in the side walls.

The arms 206 are likewise fixed to a shaft 214. The shaft 214 at one end is journaled in a bushing 215, in the wall of the dark chamber, and fixed thereto on the exterior of the camera is a lever 216. The hub of the lever 216 is provided with a plurality of holes with which cooperates a pin 217, loosely supported in a bracket 218, and the pin 217 may be lifted and dropped into anyone of the holes in the hub of the lever to hold the half-tone screen holder in any desired position.

Means are also provided to accommodate the holder to screens of various sizes. As embodied, a cross bar 224 is mounted near the upper ends of the vertically-disposed bars 200, and is vertically slidable, and on its inner face it is beveled as shown at 225, a plurality of lugs 226 being fixed thereto. The upper edge of the screen 227 rests between the bevel 225 and the lugs 226, the bevel forcing the screen accurately into position against the lugs. The bar is preferably pivoted at 224ª to accommodate irregularities in the screen edge.

A lower cross bar 227 is similar in construction to the bar 224, and is vertically variably positionable. For this purpose, it is provided with heads slidable along the bars 200. Pivotally mounted upon these heads are spring-pressed dogs 228, each having an angled nose 229, adapted to engage with any desired one of a vertically arranged series of holes 230 formed in the vertical bars 200. Thus a screen 227' of the desired size is held in exact position on the frame, and the frame is moved to and fro to vary the distance between the screen and the light-sensitive surface as desired.

Figure 17:
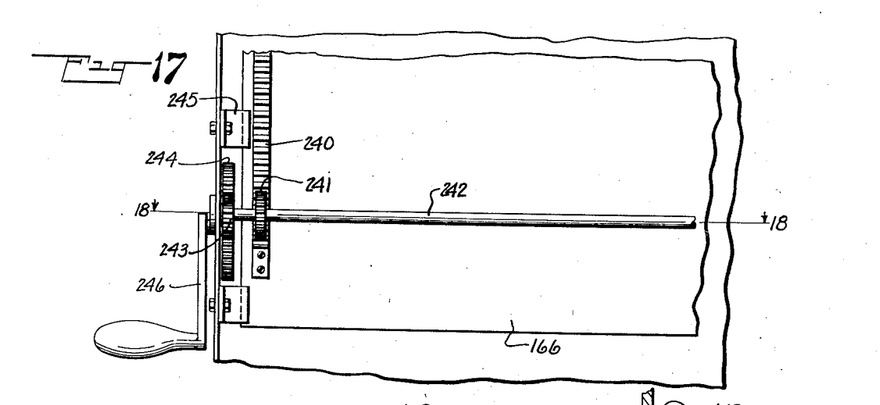
Fig. 17 is a fragmentary elevation of a modified form of positioning means for the masking slides.
Figure 19:
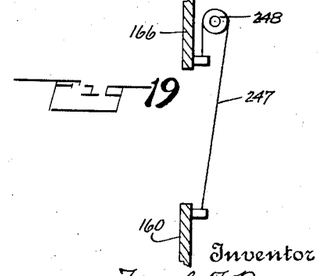
Fig. 19 is a diagrammatic view of the connection between the upper and lower masking slides of Figs. 17 and 18.

In Figs. 17 and 18 a modified form of actuating mechanism for the masking slides is shown. Therein, the upper masking slide 166 is provided at either side with straight rack-bars 240, meshing with pinions 241, fixed on a shaft 242, journaled in the machine frame. Fixed also on shaft 242 is a pinion 243, which cooperates with a gear wheel 244. Gear wheel 244 is rotatably mounted in one wall of the dark chamber and cooperates with a scale and pointer through a pinion and rack as already described. A crank 246 is provided to turn the gear wheel 244. In this form the side edges of the masking slides travel in vertically-disposed guideways 245. The connection between the two masking slides in this arrangement is shown in Fig. 19 more or less diagrammatically. Cords 247 are fixed to the slide 166 and run through pulleys 248 and are fixed to the slide 160, which drops downward by gravity and is drawn upwardly by the pull of the cords due to the movement of the slide 166.

By the present invention, the operator, while remaining at one place or station, can control practically all of the functions and operations of the camera. For example, he selects the desired size of film to be used, brings it accurately into the field of the lens and the focal plane of the camera; adjusts its position in the field, makes the exposure; cuts off the film without waste; delivers the exposed strip to a receptacle accessible to the dark room, or can permit the exposures to accumulate on the strip of sensitized material. He can adjust the area or field of exposure and secure the desired size of negative without waste of the sensitized material, by the utilization of strips of sensitized material of proper width in conjunction with the positioning of the masking slides and accurately positioning the free end of the sensitized strip and effects great speed and facility of operation with very wide diversity of sizes of negatives and economy of the sensitized strip; secures positive and rapid operation of the strip prior to, during, and subsequent to, the exposure by the power feed or pushing of the strip of sensitized materal instead of pulling it; and secures an extraordinarily large capacity at one loading of the camera. In connection with the foregoing the operator may rapidly and accurately center the image in the field and at the same time secure the exact desired size of image, that is, the desired degree of reduction or enlargement and can focus the camera accurately without inspection of the image.

Other advantages will be learned by practising the invention, and it will be understood that changes may be made from the exact structures shown and described without departing from the principles of the invention and without sacrificing its chief advantages.

What I claim is:—

1. A photographic camera including in combination a lens, a plurality of means for supporting light sensitive elements of various sizes, and a corresponding plurality of forwarding means, one for each of said supporting means, for individually forwarding the light sensitive elements endwise and presenting them at the focal plane of the camera.

2. A photographic camera including in combination a lens, means for supporting a plurality of rolls of light sensitive material, and means for presenting and positioning a portion of light sensitive material from any of the rolls at the focal plane of the camera.

3. A photographic camera including in combination a lens, means for supporting a plurality of rolls of light sensitive material of different widths and means for presenting a portion of light sensitive material from any given roll at the focal plane of the camera and pressing it in the focal plane.

4. A photographic camera including in combination a lens, means in the camera for holding at one time a plurality of light sensitive elements of various sizes, means for individually forwarding the light sensitive elements endwise into the focal plane of the camera, and means for positioning a half-tone screen relatively thereto.

5. A photographic camera including in combination a lens, means in the camera for holding at one time a plurality of light sensitive elements of various sizes, means for individually forwarding the light sensitive elements endwise into the focal plane of the camera, and for pressing the light sensitive element in such focal plane, and means for positioning a half tone screen relative thereto.

6. A photographic camera including in combination a lens, a plurality of sources of supply of light sensitive material, a corresponding plurality of forwarding means, one for each supply of light sensitive material, for individually engaging with its light sensitive material and forwarding it endwise into the focal plane of the camera.

7. A photographic camera including in combination a lens, means for supporting a plurality of rolls of light sensitive material of different sizes, and means for presenting said material from any of said rolls at the focal plane of the camera.

8. A photographic camera including in combination a lens, means for supporting a plurality of rolls of light sensitive material of different widths, and means for presenting and positioning said material from any selected one of said rolls at the focal plane of the camera.

9. A photographic camera including in combination a lens, means for supporting a plurality of rolls of light sensitive material of different sizes, and means for presenting and positioning said material from any selected one of said rolls of light sensitive material at the focal plane of the camera.

10. A photographic camera including in combination a lens, a plurality of sources of supply of light sensitive material of different sizes, a corresponding plurality of forwarding means, one for each supply of light sensitive material, for individually engaging with its light sensitive material and forwarding it endwise into the focal plane of the camera, and means for positioning a half-tone screen relatively thereto.

11. A photographic camera including in combination a lens, a dark chamber at the rear of the camera, a plurality of sources of supply of light sensitive material within the dark chamber, and a corresponding plurality of feeding devices respectively cooperating with the several sources of supply and operable from without the camera for moving said material from any selected source of supply endwise toward the focal plane of the camera without moving any other supply of light sensitive material.

12. A photographic camera including in combination a lens, means for supporting a plurality of rolls of light sensitive material, and means for feeding the sensitive strip from any selected one of said rolls into the focal plane of the camera.

13. A photographic camera including in combination a lens, a dark chamber at the rear of the camera and located therewithin means for supporting a plurality of rolls of light sensitive material, and means for feeding the sensitive strip from any selected one of said rolls into the focal plane of the camera.

14. A photographic camera including in combination a lens, a dark chamber at the rear of the camera and located therewithin means for supporting a plurality of rolls of light sensitive material, and operating means for each roll for feeding the sensitive strip from any selected one of said rolls towards the focal plane of the camera.

15. A photographic camera including in combination a lens, a plurality of sources of supply of light sensitive material, means for moving said material from any one of said sources of supply endwise toward the focal plane of the camera, and means for regulating the size of the exposure area.

16. A photographic camera including in combination a lens, means for supporting a plurality of rolls of light sensitive material, means for feeding the sensitive strip from any one of said rolls into the focal plane of the camera, and means for regulating the size of the exposure area.

17. A photographic camera including in combination a lens, means for supporting a plurality of rolls of light sensitive material, and means operable from without the camera for feeding the sensitive strip from any one of said rolls into the focal plane of the camera.

18. A photographic camera including in combination a lens, means for supporting a plurality of rolls of light sensitive material, means operable from without the camera for feeding the sensitive strip from any one of said rolls into the focal plane of the camera, and means operable from without the camera for regulating the size of the exposure area.

19. A photographic camera including in combination a lens, means for supporting a plurality of rolls of light sensitive material, operating means for each roll operable from without the camera for feeding the sensitive strip from any one of said rolls into the focal plane of the camera, and means operable from without the camera for regulating the size of the exposure area.

20. A photographic camera including in combination means for supporting a plurality of strips of severable light sensitive material, means for individually presenting a portion of a given strip at the focal plane of the lens, and means for severing the strip thus presented.

21. A photographic camera including in combination a lens, means for supporting a plurality of strips of severable light sensitive material of different widths, means for individually presenting a portion of a given strip at the focal plane of the lens, and means for severing the strip thus presented.

22. A photographic camera including in combination a lens, a plurality of sources of supply of severable light sensitive material in strip form, means for presenting said material from any of said sources of supply at the focal plane of the camera, and means for severing an exposed area of the sensitive material.

23. A photographic camera including in combination a lens, a plurality of sources of supply of severable light sensitive material in strips of different widths, means for presenting said material from any selected one of said sources of supply at the focal plane of the camera, and means for severing the exposed surfaces of different sizes.

24. A photographic camera including in combination a lens, means for supporting a plurality of rolls of severable light sensitive material, means for feeding the sensitive strip from any one of said rolls into the focal plane of the camera, and means for severing 25. A photographic camera including in combination a lens, a plurality of sources of supply of severable light sensitive material in strip form, means for presenting said material from any selected one of said sources of supply at the focal plane of the camera, means for regulating the size of the exposure area, and means for severing an exposed area of the sensitive material.

26. A photographic camera including in combination a lens, a dark chamber at the rear of the camera, a plurality of sources of supply of severable light sensitive material in strip form within the dark chamber, means operable from without the camera for presenting said material from any selected source of supply at the focal plane of the camera, means operable from without the camera for regulating the size of the exposure area, and means operable from without the camera for severing the exposed area as so regulated.

27. A photographic camera including in combination a lens, means for supporting a plurality of rolls of light sensitive material, means for feeding the sensitive strip from any one of said rolls into the focal plane of the camera, means for regulating the size of the exposure area, and means operable from without the camera for severing the exposed area as so regulated.

28. A photographic camera including in combination a lens, means for holding at one time a plurality of strips of light sensitive material, means for feeding any selected given strip of material into the focal plane of the camera, and means including a masking slide for variably regulating the exposure area.

29. A photographic camera including in combination a lens, means for holding at one time a plurality of rolls of light sensitive material, means for feeding the free end of any given roll into the focal plane of the camera, and means including a masking slide for variably regulating the exposure area.

30. A photographic camera including in combination a lens, means for holding at one time a plurality of strips of light sensitive material of different widths, means for feeding the free end of any given strip into the focal plane of the camera, and means including a pair of mutually approaching and receding masking slides for variably regulating the exposure area.

31. A photographic camera including in combination a lens, means for handling a flexible light-sensitive material in the focal plane of the camera, including a presser plate and a cooperating belt acting on the sensitive material at the focal plane and means for moving the presser plate laterally to and from pressing position.

32. A photographic camera including in combination a lens, means for handling a flexible light-sensitive material in the focal plane of the camera, including a presser plate and a cooperating endless belt acting on the sensitive material at the focal plane and means for driving the belt when the presser plate is out of pressing position.

33. A photographic camera including in combination a lens, and means for handling a flexible light sensitive material in the focal plane of the camera, including a presser plate movable laterally to and from pressing position and a cooperating belt mounted on the presser plate acting on the sensitive material at the focal plane arranged to be driven when the plate is out of pressing position.

34. A photographic camera including in combination a lens, means for handling a flexible light sensitive material in the focal plane of the camera, including a presser plate and a cooperating driven endless belt mounted on the presser plate acting on the sensitive material at the focal plane and means for severing the light sensitive material adjacent an edge of the presser plate.

35. A photographic camera including in combination a lens, means for holding at one time a plurality of rolls of light sensitive material of different widths, means for presenting and positioning light sensitive elements from the different rolls at the focal plane of the camera, and means for positioning half-tone screens of various sizes relatively thereto.

36. A photographic camera including in combination a lens, means for supporting a plurality of rolls of light sensitive material containing strips of different widths, means for presenting a portion of a selected strip at the focal plane of the lens, means for regulating the size of the exposure area, and means for supporting half-tone screens of different sizes.

37. A photographic camera comprising in combination a lens, a presser plate for holding a piece of light sensitive material at the focal plane of the lens, movable to and from pressing position, and a power driven means for carrying light sensitive material to the presser plate, the presser plate and said power driven means being inter-connected so that the power driven means is operative only when the presser plate is out of pressing position.

38. A photographic camera comprising in combination a lens, means for supporting a strip of light sensitive material, and an endless belt engageable with the strip of light sensitive material for presenting it at the focal plane of the lens for exposure, means for severing the exposed strip, the belt being adapted to thereafter eject said exposed and severed strip.

39. A photographic camera comprising in combination a lens, means for supporting a strip of light sensitive material, and an endless belt engageable with the strip of light sensitive material for presenting it at the focal plane of the lens for exposure, means for severing the exposed portion of the strip, after which such exposed portion is ejected by the endless belt.

40. A photographic camera, comprising in combination a lens, a plurality of rolls of light sensitive material, and means for longitudinally feeding selected strips of light sensitive material from any of the rolls into the focal plane of the lens.

41. A photographic camera, comprising in combination a lens, means for holding rolls of light sensitive material, means for feeding a strip of light sensitive material from any one of the rolls into the focal plane of the lens, and means for severing different lengths of light sensitive material from the strip.

42. A photographic camera, comprising in combination a lens, means for holding a plurality of rolls of light sensitive materials of different widths, means for feeding a strip of light sensitive material from any one of the rolls into the focal plane of the lens, means for varying the size of the exposure area, and means for severing different lengths of light sensitive material from the strip.

43. A photographic camera including in combination a lens, means for holding a plurality of rolls of light sensitive material of different widths, means for supplying a severable light sensitive strip from any one of the rolls to the focal plane of the lens, and means for cutting off the strip, located between the strip supply, and the focal plane of the lens.

44. A photographic camera including in combination a lens, means for holding a plurality of rolls of light sensitive material of different width, means for supplying a light sensitive strip from any one of the rolls to the focal plane of the lens, and means for cutting off the strip in various lengths, located between the strip supply, and the focal plane of the lens.

45. A photographic camera including in combination a lens, means for supporting a plurality of rolls of severable light sensitive material, means for feeding any given strip into the focal plane of the lens, and means located between the supporting means and the exposure position for the strip, for cutting any given strip into shorter lengths.

46. A photographic camera including in combination a lens, means for supporting a plurality of rolls of light sensitive material of different widths, means for feeding a given strip into the focal plane of the lens, and means located between the supporting means and the exposure position for the strip, for cutting any given strip into shorter lengths.

47. A photographic camera including in combination a lens, means for supporting a plurality of rolls of light sensitive material means for feeding the light sensitive material into the focal plane of the lens, and means located above the level of the lens for cutting the light sensitive material into shorter lengths.

48. A photographic camera including in combination a lens, means for supporting at one time a plurality of rolls of light sensitive material, means for feeding a strip of light sensitive material from any given roll into the focal plane of the lens, and means located between the roll and the exposure position for the strip, for cutting the strip into shorter lengths.

49. A photographic camera including in combination a lens, means for supporting a plurality of rolls of light sensitive material, means for feeding a strip of light sensitive material from any roll into the focal plane of the lens, and means located between the several rolls, and the exposure position for a strip, for cutting the strip into shorter lengths.

50. A photographic camera including in combination a lens, means for supporting a plurality of rolls of light sensitive material of different widths, means for feeding a strip of light sensitive material from any roll into the focal plane of the lens, and means located between the several rolls, and the exposure position for a strip, for cutting the strip into shorter lengths.

51. A photographic camera including in combination a lens, means for supporting a plurality of rolls of light sensitive material, means for feeding light sensitive material from any roll into the focal plane of the lens, and cutting means, located above the level of the lens, for cutting the light sensitive material into shorter lengths.

52. A photographic camera including in combination a lens, means for supporting a plurality of rolls of light sensitive material above the level of the lens, means for feeding light sensitive material from anyone into the focal plane of the lens, and cutting means, above the level of the lens, for cutting the light sensitive material into shorter lengths.

53. A photographic camera including in combination a lens, means for supporting at one time a plurality of rolls of severable light sensitive material about the level of the lens, means for feeding any particular strip downwardly into the focal plane of the lens, and adjustable means between the supporting means and the focal plane, for severing the strip into various lengths.

54. A camera including in combination a lens, means for holding a roll of sensitized material, means for feeding lengths of sensitized material to the focal plane of the camera, means for centering the sensitized material to be exposed relative to the lens axis, means for severing the sensitized material at the edge of its exposed portion.

55. A camera including in combination a lens, means for holding a plurality of rolls of sensitized material, means for feeding lengths of sensitized material to the focal plane of the camera, means for centering the sensitized material to be exposed relative to the lens axis, means for severing the sensitized material at the edge of its exposed portion.

56. A camera including in combination a lens, means for holding a roll of sensitized material, means for selectively and variably feeding lengths of sensitized material to the focal plane of the camera, means for centering the sensitized material to be exposed relative to the lens axis, means for severing the sensitized material at the edge of its exposed portion.

57. A camera including in combination a lens, means for holding a roll of sensitized material, means for feeding lengths of sensitized material to the focal plane of the camera, means for variably masking the sensitized material lying in the focal plane, means for centering the sensitized material to be exposed relative to the lens axis, means for severing the sensitized material at the edge of its exposed portion.

58. A camera including in combination a lens, means for holding a plurality of rolls of sensitized material, means for selectively and variably feeding lengths of sensitized material to the focal plane of the camera, means for centering the sensitized material to be exposed relative to the lens axis, means for severing the sensitized material at the edge of its exposed portion.

59. A camera including in combination a lens, means for holding a plurality of rolls of sensitized material, means for feeding lengths of sensitized material to the focal plane of the camera, means for variably masking the sensitized material lying in the focal plane, means for centering the sensitized material to be exposed relative to the lens axis, means for severing the sensitized material at the edge of its exposed portion.

60. A camera including in combination a lens, means for holding a roll of sensitized material, means for selectively and variably feeding lengths of sensitized material to the focal plane of the camera, means for variably masking the sensitized material lying in the focal plane, means for centering the sensitized material to be exposed relative to the lens axis, means for severing the sensitized material at the edge of its exposed portion.

61. A camera including in combination a lens, means for holding a plurality of rolls of sensitized material, means for selectively and variably feeding lengths of sensitized material to the focal plane of the camera, means for variably masking the sensitized material lying in the focal plane, means for centering the sensitized material to be exposed relative to the lens axis, means for severing the sensitized material at the edge of its exposed portion.

62. A camera including in combination means for feeding varying lengths of sensitized material to exposure receiving position, movable means for variably limiting the area so exposed and means for severing the exposed portion of the sensitized material from the unexposed portion.

63. A camera including in combination a lens, means for feeding varying lengths of sensitized material to exposure receiving position, movable masking means and a knife for cutting off the exposed portion of the sensitized material.

64. A camera including in combination a lens, means for holding a roll of sensitized material, means for feeding a length of the sensitized material to the focal plane of the lens, means for variably masking the sensitized material lying in the focal plane, means for centering the unmasked portion with respect to the lens axis and means for severing the exposed portion of the sensitized material.

In testimony whereof, I have signed my name to this specification.

FRANK T. POWERS.